(12) United States Patent
Sultenfuss et al.

(10) Patent No.: US 9,015,514 B2
(45) Date of Patent: Apr. 21, 2015

(54) SYSTEMS AND METHODS FOR IMPLEMENTING PERSISTENT BATTERY SHUTDOWN FOR INFORMATION HANDLING SYSTEMS

(75) Inventors: Andrew T. Sultenfuss, Leander, TX (US); Gary J. Verdun, Georgetown, TX (US); Richard C. Thompson, Cedar Park, TX (US)

(73) Assignee: Dell Products LP., Round Rock, TX (US)

( * ) Notice: Subject to any disclaimer, the term of this patent is extended or adjusted under 35 U.S.C. 154(b) by 241 days.

(21) Appl. No.: 13/596,460

(22) Filed: Aug. 28, 2012

(65) Prior Publication Data
US 2014/0068310 A1 Mar. 6, 2014

(51) Int. Cl.
G06F 1/00 (2006.01)
G06F 1/28 (2006.01)
G06F 1/30 (2006.01)
G06F 1/32 (2006.01)

(52) U.S. Cl.
CPC .. G06F 1/28 (2013.01); G06F 1/30 (2013.01); G06F 1/3212 (2013.01); Y02B 60/1292 (2013.01)

(58) Field of Classification Search
CPC .................................. G06F 1/30; H02J 7/0031
USPC .......................................... 713/323, 324, 330
See application file for complete search history.

(56) References Cited

U.S. PATENT DOCUMENTS

| 5,710,091 | A * | 1/1998 | Khare | 502/414 |
| 7,378,819 | B2 | 5/2008 | Wang et al. | |
| 7,391,184 | B2 | 6/2008 | Luo et al. | |
| 7,619,392 | B2 | 11/2009 | Wang et al. | |
| 8,138,722 | B2 | 3/2012 | Wang et al. | |
| 2001/0007117 | A1 * | 7/2001 | Cooper et al. | 710/129 |
| 2006/0264248 | A1 * | 11/2006 | Hong et al. | 455/572 |
| 2008/0180264 | A1 * | 7/2008 | Lee et al. | 340/636.15 |
| 2009/0109324 | A1 * | 4/2009 | Kaplan et al. | 348/372 |
| 2011/0252259 | A1 * | 10/2011 | Choi et al. | 713/323 |
| 2014/0068310 | A1 * | 3/2014 | Sultenfuss et al. | 713/340 |

* cited by examiner

*Primary Examiner* — Vincent Tran
(74) *Attorney, Agent, or Firm* — Egan, Peterman & Enders LLP.

(57) ABSTRACT

Systems and methods are provided for implementing a persistent battery system shutdown condition when a battery pack voltage level drops below a predetermined minimum acceptable operating voltage threshold that is above a predetermined permanent failure operating voltage threshold at which the battery pack is permanently disabled. The disclosed systems and methods may be implemented such that shutdown portion of the power-consuming components of the information handling system are not allowed to be restarted until external power has been first provided and applied to at least partially recharge the battery cells of the battery pack to a battery voltage level that is above the minimum acceptable operating voltage threshold and/or when sufficient external power is applied to power the information handling system and at the same time charge the battery cells of the battery pack.

30 Claims, 5 Drawing Sheets

SYSTEMS AND METHODS FOR IMPLEMENTING PERSISTENT BATTERY SHUTDOWN FOR INFORMATION HANDLING SYSTEMS

FIELD OF THE INVENTION

This invention relates generally to information handling systems, and more particularly to persistent battery shutdown for information handling systems.

BACKGROUND OF THE INVENTION

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Examples of portable information handling systems include notebook computers, tablet computers and smart phones. These portable electronic devices are typically powered by rechargeable battery pack systems such as lithium ion ("Li-ion") or nickel metal hydride ("NiMH") battery packs. Such battery packs are typically equipped with a battery management unit (BMU) that monitors voltage or state of charge of the battery cells of the battery pack, and that controls flow of charge current to battery cells of the battery pack and flow of discharge current from the battery based on this monitored battery cell voltage. Such battery packs are also typically equipped with a fuse that is controlled by the BMU to permanently disable the battery pack from supplying current to the information handling system for a number of possible reasons, including if the monitored battery cell state of charge ever becomes low enough to damage the battery cells or if the monitored battery cell state of charge ever drops below a pre-determined permanent failure operating voltage or capacity threshold. In modern battery packs, when the battery cells reach such a critical low voltage or capacity threshold, a permanent failure (PF) flag is set, and the BMU will blow the fuse the next time external AC adapter power is present. This is done for safety reasons to prevent further operation of the information handling system at low battery charge levels which may be damaging to the battery cells and/or which may indicate a battery cell failure.

To avoid dropping below low cell voltage and/or to avoid overdischarge stress (and the resulting permanent disablement of the battery pack by the BMU) under normal battery pack operating conditions, the BMU and/or operating system (OS) of the typical information handling system shuts off or reduces current flow from the battery pack to the information handling system at a battery voltage level that is above the permanent failure operating voltage threshold. In the OS case, the OS monitors the current voltage of the battery pack battery cells that is reported to the OS by the BMU or receives an alert from the BMU when a pre-established threshold has been crossed. Either way, the BMU and/or OS react to the value of the monitored battery voltage level by individually shutting down power-consuming components (load) of the information handling system or by shutting down flow of current to the information handling system from the battery pack when the monitored battery voltage drops below a pre-determined minimum acceptable operating voltage threshold that is set above the pre-determined permanent failure operating voltage threshold. When current draw from the information handling system is shutdown in this manner, the charge level or voltage of the battery cells of the battery pack may recover under no load conditions to a voltage that is equal to or higher than the minimum acceptable operating voltage threshold. When this occurs, the OS and/or BMU will allow the power-consuming components of the information handling system to be restarted until the monitored battery voltage once again drops below the minimum acceptable operating voltage threshold, and further reducing the amount of voltage "cushion" above the absolute permanent failure operating voltage threshold at which the BMU permanently disables the battery pack.

SUMMARY OF THE INVENTION

Disclosed herein are systems and methods for implementing a persistent system shutdown condition at a battery pack voltage (e.g., predetermined minimum acceptable operating voltage threshold) that is above a pre-determined permanent failure operating voltage threshold at which the battery pack is permanently disabled. In contrast to the reactive manner in which power-consuming components of information handling systems are conventionally shut-off below a minimum acceptable operating voltage threshold, the disclosed systems and methods may be implemented to effect a persistent shutdown of at least a portion of the power consuming components of an information handling system when battery pack voltage drops below a predetermined minimum acceptable operating voltage threshold. Because the shutdown is persistent, the shutdown power-consuming components of the information handling system are not allowed to be restarted (turned on) in one embodiment until external power has been first provided and applied to at least partially recharge the battery cells of the battery pack to a battery voltage level that is above the minimum acceptable operating voltage threshold. Additionally, the shutdown power-consuming components of the information handling system may also be allowed to be turned on when sufficient external power (e.g., from AC adapter) is applied to power the information handling system and charge the battery cells of the battery pack.

The disclosed systems and methods may be implemented in one embodiment to avoid reaching a pre-determined permanent failure operating voltage threshold that results in permanent disablement of a battery pack. However, other advantages that may be additionally or alternatively realized using embodiments of the disclosed systems and methods include, but are not limited to, reducing time required to recharge from low cell voltage recovery mode (also called pre-charge mode) and/or minimizing any cell performance degradation associated with discharge below normal shutdown (and above permanent fail condition.)

In one exemplary embodiment, the disclosed systems and methods may be implemented by setting at least one shutdown flag in persistent memory that indicates a system state exists in which the battery pack voltage has dropped below a predetermined minimum acceptable operating voltage threshold value resulting in shutdown of one or more power consuming components (e.g., system load) of an information handling system, e.g., by an OS of the system. Presence of this shutdown flag in persistent memory prevents system restart (e.g., by the OS) until the shutdown flag is removed. In this regard, this shutdown flag will remain in persistent memory until external power has been first provided and applied to at least partially recharge the battery cells of the battery pack to a battery voltage level that is above the minimum acceptable operating voltage threshold and/or when sufficient external power (e.g., from AC adapter) is applied to power the information handling system and at the same time charge the battery cells of the battery pack.

In another exemplary embodiment, it is possible that an information handling system may be optionally configured such that the OS of the system shuts down power consuming components of the information handling system when the current (e.g., real time) monitored battery cell voltage drops below an OS minimum acceptable operating voltage threshold value, and that the BMU of the system separately shuts down power current flow from the battery pack when the current monitored battery cell voltage drops below a BMU minimum acceptable operating voltage threshold value that is lower than the OS minimum acceptable operating voltage threshold value but that is above the pre-determined permanent failure operating voltage threshold at which the BMU is configured to permanently disable the battery pack, e.g., by blowing a fuse in the current path between the battery pack and the power consuming components of the information handling system. In such an optional embodiment, different shutdown flags may be set in persistent memory, an OS shutdown flag upon occurrence of the OS shutdown and a BMC shutdown flag upon occurrence of a BMU shutdown. Where an embedded controller (EC) is also present, an additional separate EC shutdown flag may also be set in persistent memory when the current monitored battery cell voltage drops below an EC minimum acceptable operating voltage threshold value that is lower than the OS minimum acceptable operating voltage threshold value but that is above the BMU minimum acceptable operating voltage threshold value.

In one respect, disclosed herein is an information handling system, including: one or more battery cells configured to be coupled to receive current from an external power source for recharging the battery cells; a system load including power consuming circuitry coupled to selectably receive current from the external power source, the battery cells, or a combination thereof, the system load including one or more processing devices; persistent memory; and persistent shutdown management circuitry including at least one of the processing devices coupled to the persistent memory. At least one of the processing devices may be configured to monitor the current charge level of the battery cells, and at least one of the processing devices may be configured to execute an operating system thereon and to initiate shut down of the operating system and disconnection of at least a portion of the system load from the battery cells when the monitored battery charge level is below a predetermined minimum acceptable operating voltage threshold value. The persistent shutdown management circuitry may be configured to: store a persistent shutdown indication in the persistent memory upon the occurrence of a shutdown of the operating system and the disconnection of at least a portion of the system load from the battery cells due to a monitored battery charge level that is below the predetermined minimum acceptable operating voltage threshold value; determine the presence of available power from the external power source and determine whether the persistent shutdown indication is stored in the persistent memory; if the persistent shutdown indication is determined to be stored in the persistent memory then allow one or more of the processing devices to reconnect the system load to the battery cells and to restart the operating system only if available power from the external power source is determined to be present for providing current to recharge the battery cells; and if the persistent shutdown indication is determined to be stored in the persistent memory then only clear the persistent shutdown indication from persistent memory if available power from the external power source is determined to be present for providing current to recharge the battery cells.

In another respect, disclosed herein is a method for implementing persistent battery shutdown for an information handling system. The method may include providing an information handling system that itself includes: one or more battery cells configured to be coupled to receive current from an external power source for recharging the battery cells, system load including power consuming circuitry coupled to selectably receive current from the external power source, the battery cells, or a combination thereof, the system load including one or more processing devices, persistent memory, and persistent shutdown management circuitry including at least one of the processing devices coupled to the persistent memory. The method may further include: 1) using at least one of the processing devices to monitor the current charge level of the battery cells; using at least one of the processing devices to execute an operating system thereon and to initiate shut down of the operating system and disconnection of at least a portion of the system load from the battery cells when the monitored battery charge level is below a predetermined minimum acceptable operating voltage threshold value; and 2) using the persistent shutdown management circuitry to: store a persistent shutdown indication in the persistent memory upon the occurrence of a shutdown of the operating system and the disconnection of at least a portion of the system load from the battery cells due to a monitored battery charge level that is below the predetermined minimum acceptable operating voltage threshold value, determine the presence of available power from the external power source and determine whether the persistent shutdown indication is stored in the persistent memory, if the persistent shutdown indication is determined to be stored in the persistent memory then allow one or more of the processing devices to reconnect the system load to the battery cells and to restart the operating system only if available power from the external power source is determined to be present for providing current to recharge the battery cells, and if the persistent shutdown indication is determined to be stored in the persistent memory then only clear the persistent shutdown indication from persistent memory if available power from the external power source is determined to be present for providing current to recharge the battery cells.

DESCRIPTION OF ILLUSTRATIVE EMBODIMENTS

Figure 1:
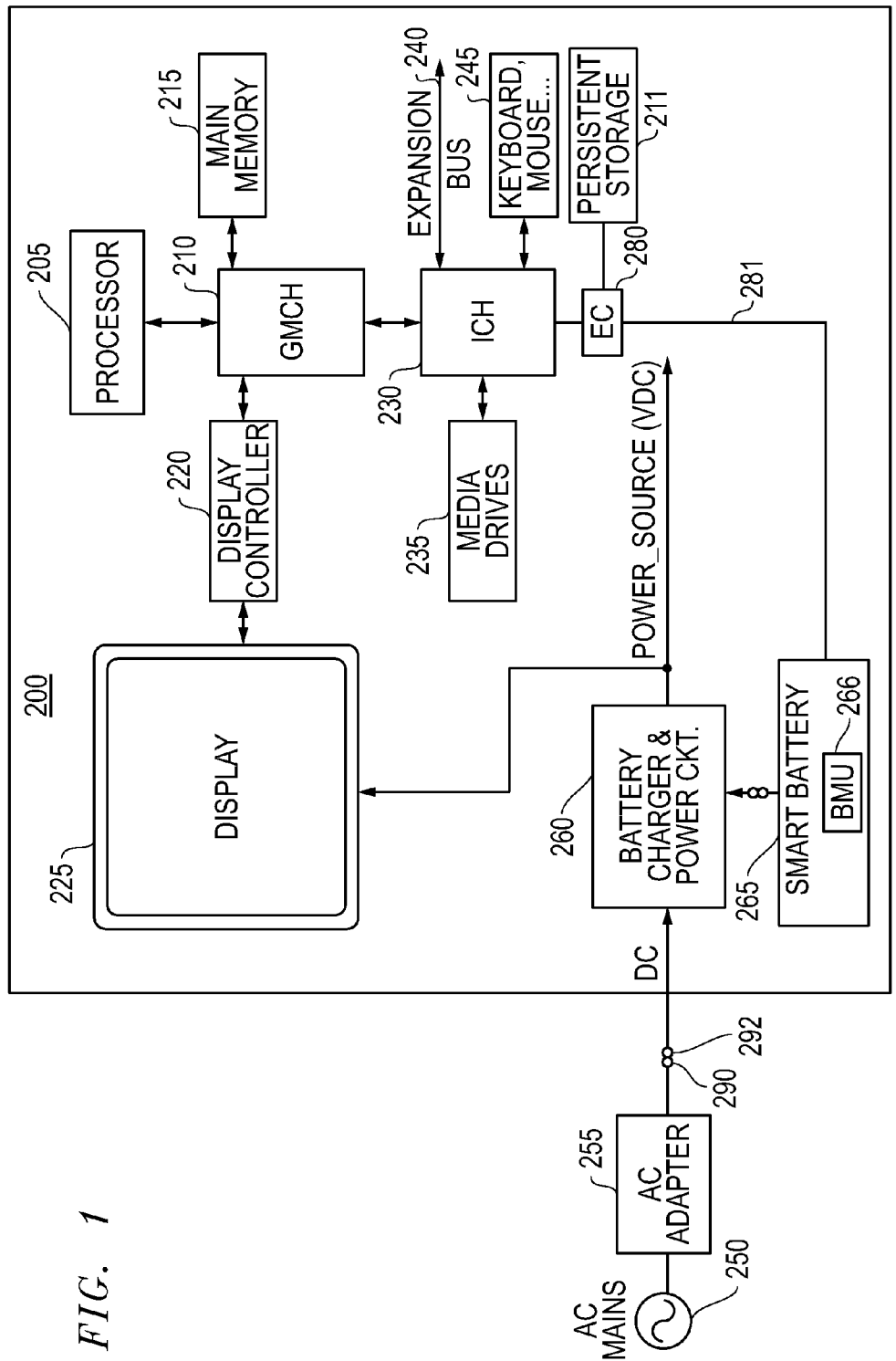
FIG. 1 illustrates a block diagram of an information handling system according to one exemplary embodiment of the disclosed systems and methods.

FIG. 1 is a block diagram of an information handling system 200 (e.g., portable information handling system such as notebook computer, MP3 player, personal data assistant (PDA), cell phone, smart phone, cordless phone, tablet computer, etc.) as it may be configured according to one exemplary embodiment of the disclosed systems and methods. As shown in FIG. 1, information handling system 200 of this exemplary embodiment includes a processor 205 such as an Intel Pentium series processor, an Advanced Micro Devices (AMD) processor or one of many other processors currently available. Processor 205 may be configured to execute an operating system (OS) such as Windows-based operating system, Linux-based operating system, etc. A graphics/memory controller hub (GMCH) chip 210 is coupled to processor 205 to facilitate memory and display functions. System memory 215 and a display controller 220 are coupled to GMCH 210. A display device 225 (e.g., video monitor) may be coupled to display controller 220 to provide visual images (e.g., via graphical user interface) to the user. An I/O controller hub (ICH) chip 230 is coupled to GMCH chip 210 to facilitate input/output functions for the information handling system. Media drives 235 are coupled to ICH chip 230 to provide permanent storage to the information handling system.

Still referring to FIG. 1, an expansion bus 240 is coupled to ICH chip 230 to provide the information handling system with additional plug-in functionality. Expansion bus 240 may be a PCI bus, PCI Express bus, SATA bus, USB or virtually any other expansion bus. Input devices 245 such as a keyboard and mouse are coupled to ICH chip 230 to enable the user to interact with the information handling system. An embedded controller (EC) 280 running system BIOS is also coupled to ICH chip 230. Persistent storage 211 (e.g., embedded and partitioned flash memory, Electrically Erasable Programmable Read Only Memory—EEPROM, etc.) is coupled to EC 280 for storing persistent information such as shutdown flags described further herein.

In the particular embodiment of FIG. 1, information handling system 200 is coupled to an external source of power, namely AC mains 250 through AC adapter 255. It will be understood that external power may be alternatively provided from any other suitable external source (e.g., external DC power source) or that AC adapter 255 may alternatively be integrated within an information handling system 200 such that AC mains 250 supplies AC power directly to information handling system 200. As shown AC adapter 255 is removably coupled to, and separable from, battery charger/power circuit 260 of information handling system 200 at mating interconnection terminals 290 and 292 in order to provide information handling system 200 with a source of DC power to supplement DC power provided by battery cells of a battery system in the form of smart battery pack 265, e.g., lithium ion ("Li-ion") or nickel metal hydride ("NiMH") battery pack including one or more rechargeable batteries and a BMU that includes an analog front end ("AFE") and microcontroller. Further, a battery system data bus (SMBus) 281 is coupled to smart battery pack 265 to provide battery state information, such as battery voltage and current information, from BMU 266 of smart battery pack 265 to EC 280 and to other components such as processor 205. Battery charger/power circuit 260 of information handling system 200 may also provide DC power for recharging battery cells of the battery system 265 during charging operations.

When a battery system of a portable information handling system is optionally provided as a replaceable battery pack, it may be configured for insertion and removal from a corresponding battery pack compartment defined within the chassis of the information handling system (e.g., such as a notebook computer), and may be provided with external power and data connector terminals for contacting and making interconnection with mating power connector terminals and data connector terminals provided within the battery pack compartment to provide power to the system load (i.e., power-consuming components) of the information handling system and to exchange data with one or more processing devices of the information handling system.

Figure 2:
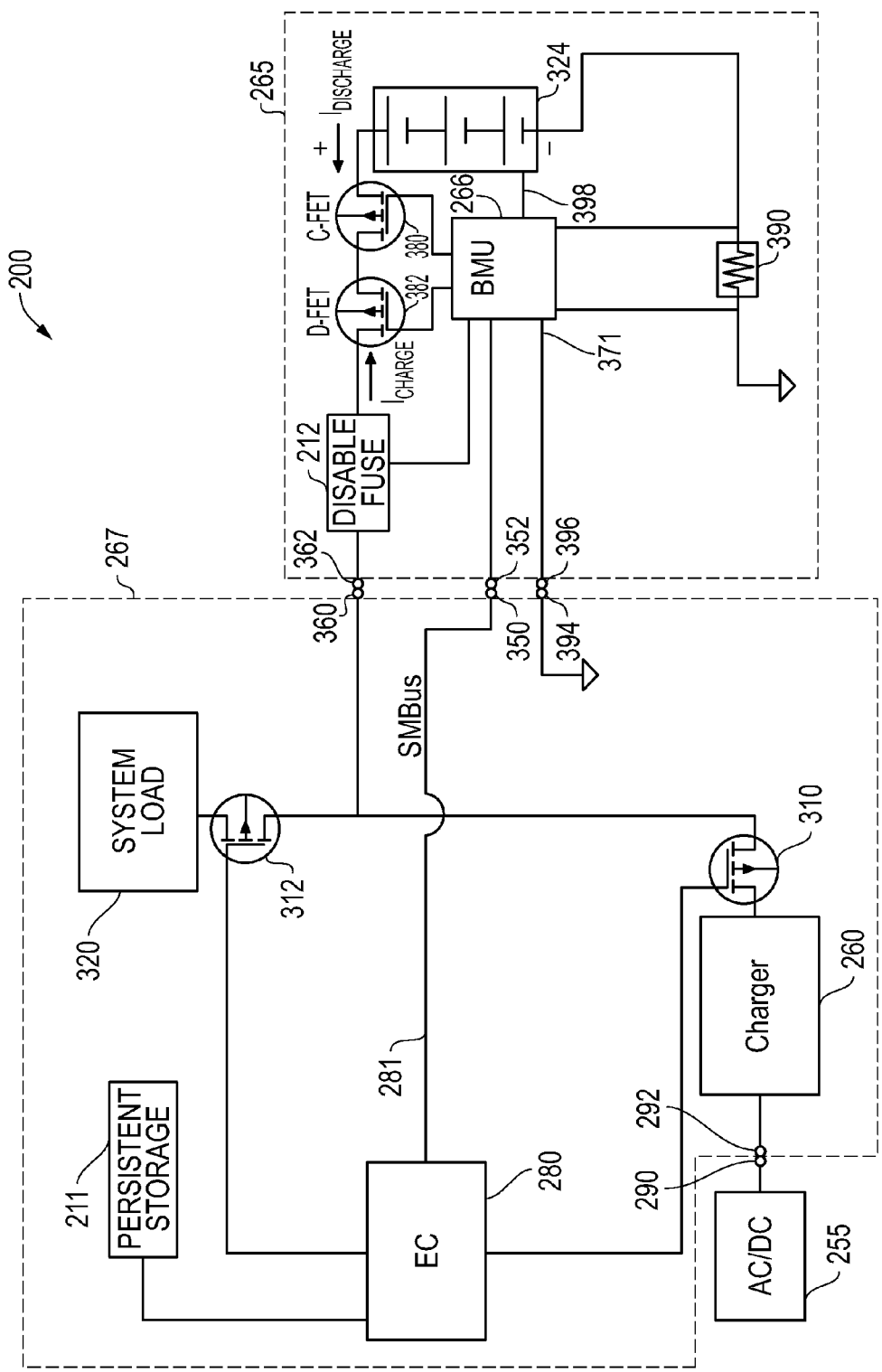
FIG. 2 illustrates a block diagram of an information handling system according to one exemplary embodiment of the disclosed systems and methods.

For example, as shown for the exemplary embodiment of FIG. 2, replaceable smart battery pack 265 may be removably coupled to, and is separable from, other system components 267 of information handling system 200 at a terminal node by engagement of system side electrical power terminals 360, 394 with battery pack side electrical power terminals 362, 396 (operational electrical contact). In this regard, smart battery pack 265 may include battery cell circuitry 324 coupled to electrical power terminals 362 that are configured to be removably coupled to system side electrical power terminals 360 so that terminals 360 contact terminals 362 to allow current to be interchanged between smart battery pack 265 and other system components 267 of information handling system 200. Battery cell circuitry 324 may be any type of rechargeable battery cell/s or combination thereof that is suitable for recharging. Examples of such battery cells include, but are not limited to, Li-ion battery cells, NiMH battery cells, nickel cadmium (NiCd) battery cells, lithium-polymer (Li-polymer) battery cells, etc.

Battery pack 265 also includes SMBus terminals 352 that are configured to be removably coupled to system side SMBus terminals 350 to allow data to be interchanged between smart battery pack 265 and EC 280. A logic control circuit 398 is also present to control and convey battery cell status information to BMU 266 from battery cell circuitry 324, and to convey control signals from BMU 266 to switching circuitry that is coupled between battery cell circuitry 324 in a manner that will be described further herein. It will be understood that functions of EC 280 may alternatively be performed by a keyboard controller in other embodiments. Also shown in FIG. 2 are switching elements 310 and 312 which are each controlled by EC 280, and which may be present to regulate current flow from charger 260 and to regulate current flow to system load 320, respectively. In this regard, system load 320 may comprise system components other than EC 280 and BMU 266, such as display 225, processor 205, media drives 235, etc. of FIG. 1. In other embodiments, system load may include at least one processing device configured to execute an OS along with additional, fewer or alternative system components that draw current. It will be understood that any other number and/or type of switching elements suitable for controlling current flow between charger 260, system load 320 and/or battery pack 265 may be present. Examples of types of suitable switching elements include, but are not limited to, bipolar junction transistors (BJTs) and field effect transistors (FETs).

Smart battery pack 265 is also shown provided with battery current control circuitry to control flow of charge current to battery cell circuitry 324 of battery pack 265, and to also control flow of discharge current from battery cell circuitry 324 of battery pack 265. In this exemplary embodiment, the charge and discharge circuitry includes two field effect transistors ("FETs") 380 and 382 coupled in series between battery charge terminal 362 and battery cell circuitry 324. FET 380 is a charge FET switching element that forms a part of a charge circuit that is controlled by components (e.g., microcontroller and/or AFE) of BMU 266 to allow or disallow charge current to the battery cell circuitry 324, and FET 382 is a discharge FET switching element that forms a part of discharge circuit that is controlled by components (e.g., microcontroller and/or AFE) of BMU 266 to allow or disallow discharge current from the battery cell circuitry 324. Body diodes may be present across the source and drain of each FET switching element, i.e., to conduct charge current to the battery cell/s when the discharge FET switching element 382 is open, and to conduct discharge current from the battery cell/s when the charge FET switching element 380 is open. It will be understood that battery current control circuitry of battery pack 265 may include any other number and/or type of charge and discharge switching elements suitable for performing the current control tasks described herein. Examples of types of suitable switching elements include, but are not limited to, bipolar junction transistors (BJTs) and field effect transistors (FETs).

During normal battery pack operations both charge and discharge FET switching elements 380 and 382 are placed in the closed state by BMU 266, which also monitors voltage of battery cell circuitry 324. If BMU 266 detects a battery overvoltage condition, BMU 266 opens the charge FET switching element 380 to prevent further charging of the battery cell/s until the over-voltage condition is no longer present. Similarly, if BMU 266 detects a battery under-voltage (or overdischarge) condition in which monitored battery voltage drops below a predetermined safe shut off voltage threshold for EC 280, BMU 266 opens the discharge FET switching element 382 to prevent further discharging of the battery cell/s from battery pack 265 until the under-voltage condition is no longer present. As will be further described herein, BMU 266 may also shut itself down to prevent further battery cell drain if BMU 266 detects that monitored battery voltage has dropped below a predetermined safe shut off voltage BMU 266 that is lower than the predetermined safe shut off voltage threshold for EC 280. BMU 266 may also open the charge FET switching element 214 when the battery pack is in sleep mode. A current sense resistor 390 is present in the battery pack circuitry to allow BMU 266 to monitor charge/discharge current to/from the battery cell/s.

A disable fuse 212 is coupled in the input/output path from with battery pack side electrical power terminal 362 such that when blown, the battery pack 265 is permanently disabled. A micro-controller within the BMU 266 is configured to provide a control signal to the disable fuse 206 that will cause the fuse to be blown, e.g., in the event of a battery system failure detection (such as over-voltage charging or overloading, under voltage below a pre-determined permanent failure operating voltage threshold) or a battery cell failure detection. Further information on other possible BMU, battery pack and battery charging operations may be found in U.S. Pat. Nos. 7,378,819, 7,391,184, 7,619,392, and 8,138,722, each of which is incorporated herein by reference in its entirety.

It will be understood that the particular configuration of components in FIGS. 1 and 2 is exemplary only and that other configurations of fewer, additional and/or alternative components are possible as are appropriate for a given particular type of battery-powered portable information handling system. It will also be understood that, when present, processing devices (such as processor 205, EC 280 and BMU 266) may be communicatively coupled in signal communication with each other using any type of data communication bus or other type of signal communication technology suitable for transferring data therebetween. Moreover, the tasks of such processing devices may be implemented separately or together using any combination of one or more suitable processing devices, e.g., such as central processing unit (CPU), controller, microcontroller, processor, microprocessor, field programmable gate array (FPGA), application specific integrated circuit (ASIC), etc.

Figure 3:
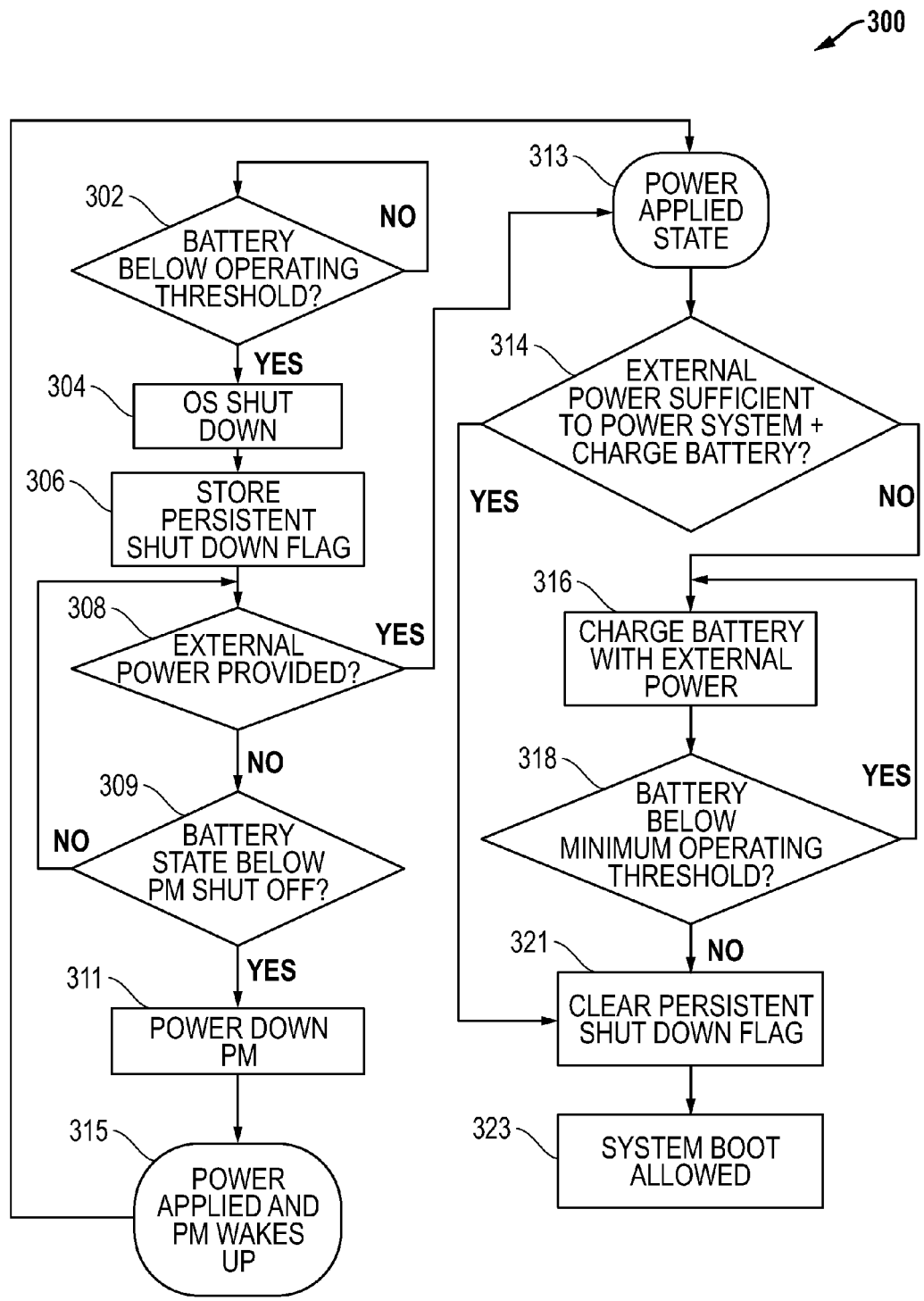
FIG. 3 illustrates a flowchart for persistent shutdown management as it may be implemented according to one exemplary embodiment of the disclosed systems and methods.

FIG. 3 illustrates one exemplary embodiment of methodology 300 for implementing persistent battery shut-off for an information handling system as it may be implemented by persistent shutdown management (PM) circuitry for any type of battery powered information handling system having at least one processing device configured to execute an operating system (OS). Methodology 300 may be implemented with information handling systems having CPU, embedded controller (EC) and battery management unit (BMU) such as notebook computers or may be implemented with information handling systems having only a BMU and no EC, such as smart phones and tablet computers. It is also possible that methodology 300 may be implemented with a system having only a single processing device. In any case, any one or more processing devices (EC, BMU and/or CPU) of an information handling system may be configured alone or in combination as a persistent shutdown management circuitry that includes persistent memory such as persistent storage 211.

Methodology 300 starts in step 302 with information handling system powered up in normal operating mode (e.g., S0 power state) and executing the operating system (OS). In step 302, the persistent shutdown management circuitry (e.g., including EC, BMU and/or CPU) monitors current battery charge level to determine if the battery charge level has dropped below a predetermined minimum acceptable operating voltage threshold value, e.g., that is set at an operating voltage threshold value in which sufficient charge level remains in the battery to allow system restart. As long as the current battery charge level is not below the minimum acceptable operating voltage threshold, the information handling system remains powered up in normal operating mode and executing the operating system (OS). However, once the monitored battery charge level has dropped below a predetermined minimum acceptable operating voltage threshold value, then OS shuts down together with one or more other power-consuming components of the information handling system to conserve battery power in step 304 as shown. At this point the processing device/s implementing the persistent shutdown management circuitry remains active and stores a persistent shutdown flag in persistent memory in step 306. Upon every attempted reboot of the system (e.g., initiated by a user or by one or more component/s of the information handling system), the persistent shutdown management circuitry checks for the presence of such a persistent shutdown flag in persistent memory and, if such a shutdown flag is present, will not allow the system to proceed to reboot until the flag is cleared.

In step 308, the persistent shutdown management circuitry monitors for the presence of external power (e.g., from an AC adapter, car charger, airplane charger, etc.), and proceeds to step 313 if it is detected that power has been applied to the system. Then methodology 300 proceeds to step 314 where the persistent shutdown management circuitry determines if sufficient external power exists to power the information handling system in normal operating state (e.g., S0 power state) and at the same time charge the system battery. If so, then the persistent shutdown flag is cleared from persistent memory in step 321 and the system is allowed to reboot with the OS in step 323. However, if insufficient external power exists to power the information handling system in normal operating state together with charging the system battery, methodology 300 proceeds to step 316 where the battery is charged with external power. While charging occurs, the persistent shutdown management circuitry monitors the state of charge of the battery in step 318 until it is determined that the current battery state of charge is not below the predetermined minimum acceptable operating voltage threshold value, at which time the persistent shutdown flag is cleared from persistent memory in step 321 and the system is allowed to reboot with the OS in step 323 as shown.

If no external power is provided in step 308, then persistent shutdown management circuitry determines in step 309 if the current battery charge state is below a predetermined safe shut off voltage threshold for the processing device/s that implement the persistent shutdown management circuitry, and these processing device/s are shutdown in step 311 once the battery charge state is found to be below this threshold. The system then remains in shutdown state (e.g., G2 or G3 power state) until power is reapplied in step 315 and the processing device wakes up to implement the persistent shutdown management circuitry in the power applied state 313 previously described.

Figure 4A:
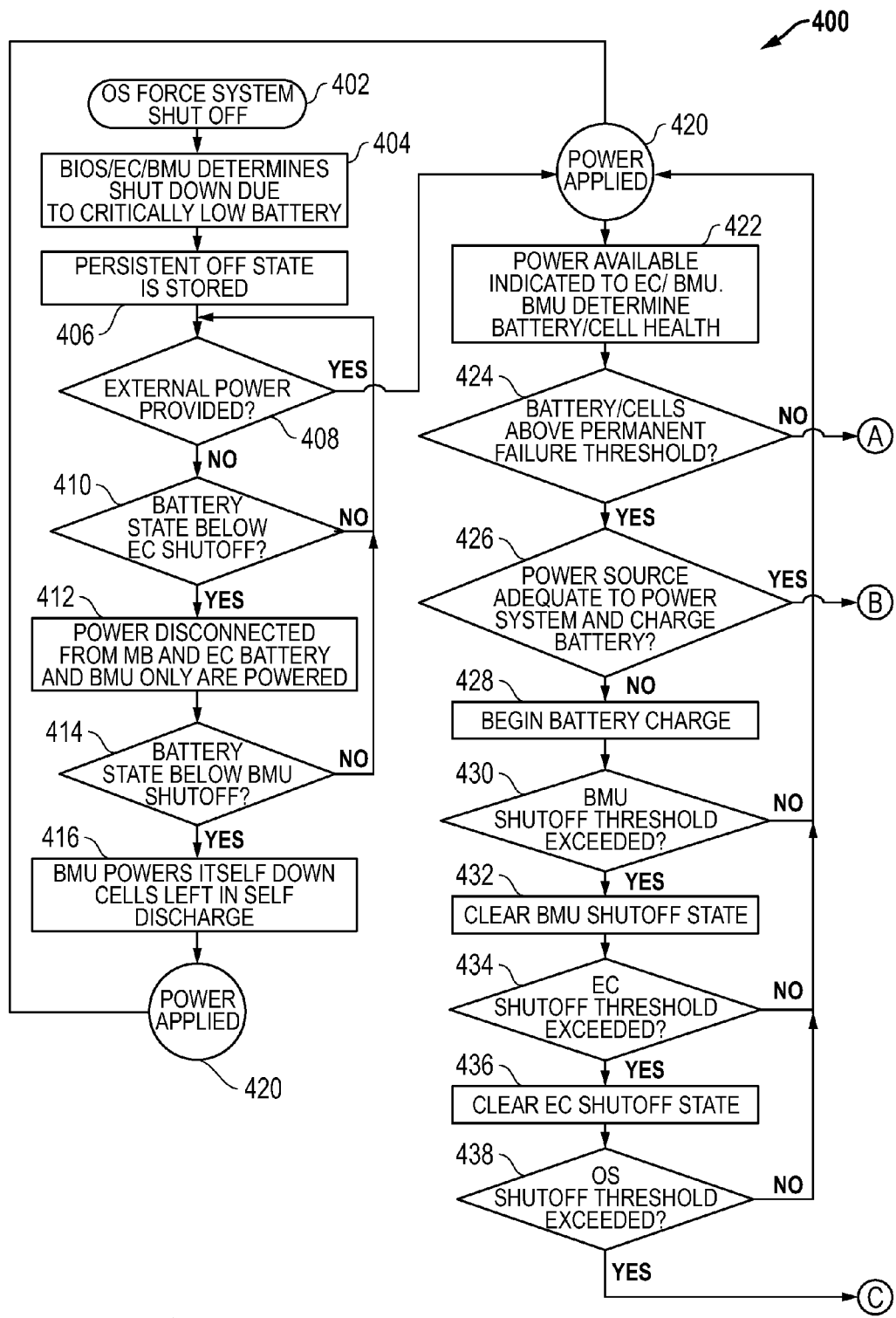
FIG. 4 illustrates a flowchart for persistent shutdown management as it may be implemented according to one exemplary embodiment of the disclosed systems and methods.
Figure 4B:
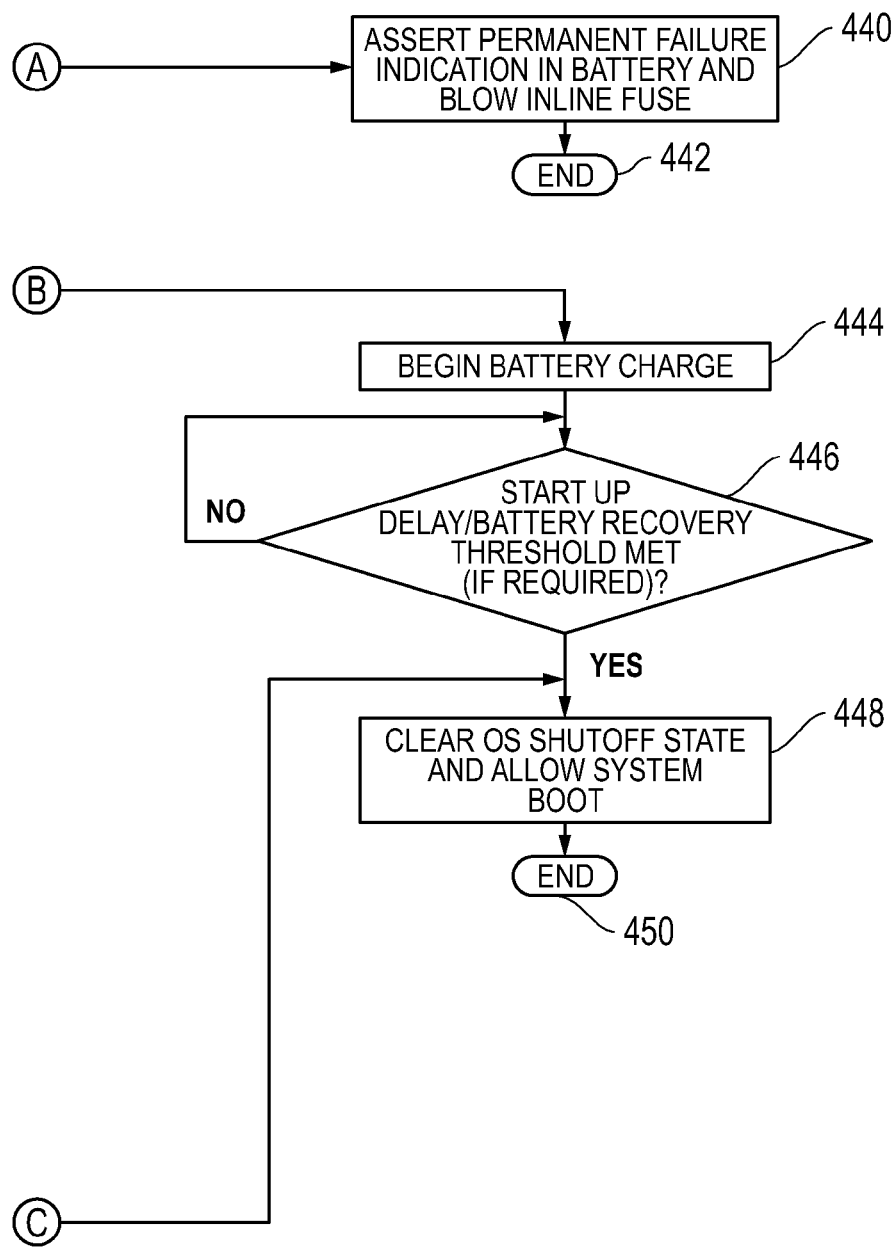

FIG. 4 illustrates one particular exemplary embodiment of methodology 400 for implementing persistent battery shutoff for an information handling system that includes multiple processing devices, e.g., such as processor 205, EC 280 and BMU 266, of the information handling system 200 of FIGS. 1-2. However, it will be understood that methodology 400 may be implemented with any other configuration of battery-powered information handling system to control current supplied from one or more battery cells to one or more power consuming components of the information handling system.

Methodology 400 starts in step 402 where the operating system (OS) executing on processor 205 initiates and forces a system shutdown (e.g., via EC 280 and switching element 312) based on a monitored current battery voltage of battery pack 265 reported to processor 205 by BMU 266 that has dropped below a predetermined minimum acceptable operating voltage threshold value that is stored, e.g., in main memory 215. Such a predetermined minimum acceptable operating voltage threshold value may be selected based on a given situation (e.g., in one exemplary embodiment a battery cell voltage that corresponds to about 5% remaining battery cell capacity), but is above the respective predetermined safe shut off voltage threshold values for EC 280 and BMU 266. Prior to this shutdown, a user may be given warning by the OS that a system shutdown is imminent absent application of external power.

Upon OS-initiated system shutdown in step 402, one or more processing devices configured to operate as persistent shutdown management circuitry determine or detect in step 404 that an OS-initiated system shutdown due to low battery state has occurred in step 402. In the illustrated embodiment of FIGS. 1-2, EC 280 and BMU 266 may each be configured to simultaneously operate to manage persistent shut-off methodology 400 for system 200 as further described herein, although any one or more processing devices may be alternatively or additionally configured to operate as persistent shutdown management circuitry, e.g., such as a power management integrated circuit (PMIC), etc. In the illustrated embodiment, an OS-initiated system shutdown event may be communicated from the OS executing on processor 205 to each of EC 280 and to BMU 266. In response to the OS-initiated system shutdown event, EC 280 may disconnect power from system load 320 of system 200, e.g., by opening D-FET 312.

Upon determining that an OS-initiated system shutdown has occurred, each of the persistent shutdown management circuitry may store a persistent off state indication in persistent memory in step 406. For example, in the exemplary embodiment of FIGS. 1-2, EC 280 may store a persistent OS off shutdown flag in persistent storage 211, and also send the persistent OS shutdown flag to BMU 266 for storage in BMU non-volatile memory that is coupled to BMU. Alternatively, a persistent OS off shutdown flag may be stored in a common location that is accessible by both EC 280 and BMU 266, e.g., such as BMU non-volatile memory where BMU 266 may access the flag in memory even when EC 280 is shutdown. Similar flag storage operations may be employed for other optional persistent shutdown flags such as persistent EC shutdown flag and/or persistent BMU shutdown flag. It will be understood that a persistent shutdown flag/s may be alternatively or additionally stored in these or any other suitable type/s of persistent memory by other designated persistent shutdown management circuitry processing devices, e.g., such as a power management integrated circuit (PMIC), etc.

As will be described further herein, the persistent shutdown management circuitry (such as EC 280 and/or BMU 266) will not allow the system 200 to attempt a re-boot to the OS until the persistent OS shutdown flag is removed (or cleared) from persistent memory. In this regard, a persistent OS shutdown flag will not be cleared until the persistent shutdown management circuitry detects that external power is provided to system 200 from an external source (e.g., AC adapter 255) that is capable of both powering the system load 320 of system 200 and charging battery cells of battery pack 265, or upon detecting that the battery cells of battery pack 265 have been recharged to a sufficient charge level for powering the system load of system 200 in combination with a connected external power source that is alone not capable of powering the system load 320 of system 200 but that is capable of power the system load 320 of system 200 in combination with power from the battery cells of battery pack 265 while at the current charge level.

In one exemplary embodiment, persistent shutdown management circuitry processing device/s such as EC 280 and BMU 266 may remain active in a low power mode (e.g., using aggressive power management if available to save power) after storing the persistent OS shutdown flag in persistent storage, for as long as the current monitored charge level of battery pack 265 does not drop below a respective predetermined safe shut off voltage threshold for either of EC 280 or BMU 266 (i.e., the respective threshold charge value below which EC 280 or BMU 266 completely powers down). In this regard, the predetermined safe shut off voltage threshold for EC 280 is typically set at a higher value of battery charge than the predetermined safe shut off voltage threshold for BMU 266 such that EC 280 shuts down before BMU 266 shuts down as the voltage level of battery pack 265 drops over time. Each of the safe shut off voltage thresholds for EC 280 and BMU 266 are in turn greater than a pre-determined permanent failure operating voltage threshold for battery pack 265, at which BMU 266 permanently disables the battery pack 265 by blowing disable fuse 212.

Still referring to FIG. 4, EC 280 acting as one of the persistent shutdown management circuitry processing devices (e.g., while operating in lower power mode) is configured to determine whether external power (e.g., from AC adapter 255) is being provided to information handling system 200. If not, then EC 280 checks in step 410 whether the current charge level of battery pack 265 is below the predetermined safe shut off voltage threshold for EC 280. If not, then methodology 400 loops back to step 408 as shown and repeats. However, if the current charge level of battery pack 265 is found in step 410 to be below the predetermined safe shut off voltage threshold for EC 280, then the BMU 266 may be configured to shut down and disconnect power from EC 280 and the motherboard in step 412, leaving only BMU 266 of battery pack 265 powered and disconnected from the remainder of the system 200. A persistent EC shutdown flag may be stored in persistent memory at this time by either of EC 280 and/or BMU 266.

As shown, BMU 266 then monitors in step 414 whether the current charge level of battery pack 265 is below the predetermined safe shut off voltage threshold for BMU 266. If not, then methodology 400 loops back to step 408 as shown and repeats. However, if the current charge level of battery pack 265 is found in step 414 to be below the predetermined safe shut off voltage threshold for BMU 266, then BMU 266 shuts down in step 416, leaving battery cells of battery pack 265 disconnected from external load and in self discharge until such time that external power is provided to system 200 (e.g., from AC adapter 255 or any other suitable power source) in step 420 as shown. A persistent BMU shutdown flag may be stored in persistent memory at this time by BMU 266. Once a power applied condition of step 420 is detected, then methodology 400 proceeds as described further herein.

Returning now to step 408, as long as EC 280 is operating, it continues to monitor for the presence of external power in step 408 in the manner previously described. Upon detecting that power is applied in step 408 (e.g., by AC adapter 255), methodology 400 proceeds to step 420 and then on to step 422 where BMC 266 and EC 280 wake up (i.e., if not already awake) upon detection of the application of available external power, and BMU 266 determines battery cell health in step 424 by determining if current charge level (voltage) of battery cells of battery pack 265 is greater than a pre-determined permanent failure operating voltage threshold for battery pack 265. If current voltage of battery pack 265 is not greater than the pre-determined permanent failure operating voltage threshold in step 424, then BMU asserts a permanent failure indication in step 440 by setting a permanent failure (PF) flag in persistent memory that causes BMU 266 to permanently disable the battery pack 265 by blowing fuse 212 the next time that external power (e.g., AC adapter 255) is provided to system 200. Methodology 400 then ends in step 442 as shown.

However, if BMU 266 determines in step 424 that current charge level (voltage) of battery cells of battery pack 265 is greater than the pre-determined permanent failure operating voltage threshold for battery pack 265, then methodology 400 proceeds to step 426 where EC 280 determines (e.g., by checking the AC adapter identifier) whether the connected external power source (e.g., AC adapter 255) is capable of providing sufficient power to simultaneously run the system load 320 of system 200 while at the same time charging battery cells of battery pack 265. If so, then BMU 266 allows battery charging to begin in step 444, and any existing persistent BMU shutdown or persistent EC shutdown flags are cleared from persistent memory when current monitored charge level of battery pack 365 exceeds respective persistent BMU shutdown threshold and respective EC shutdown threshold during the charging operation.

After charging commences in step 444, an optional system start-up delay may be implemented in step 446 during which charging of battery pack 265 continues while it is determined if sufficient battery charge level has met or exceeded the predetermined minimum acceptable operating voltage threshold value for startup of system 200 (i.e., startup of processor 205 and other power consuming components). If not, then system start up delay continues until current battery charge level reaches the predetermined minimum acceptable operating voltage threshold value and then proceeds as shown to step 448 where the persistent shutdown flag is cleared from persistent memory to allow EC 280 (e.g., using BIOS executing thereon) to again supply power to system load 320 (e.g., by closing D-FET 312) and to allow system boot and OS operation to be initiated on processor 205. Methodology 400 then terminates in step 450 as shown.

However, if in step 426, EC 280 determines that the connected external power source is not capable of providing sufficient power to simultaneously run the system load 320 of system 200 while at the same time charging battery cells of battery pack 265, then methodology 400 proceeds to step 428 where BMU 266 allows battery charging to begin.

During charging, it is determined in step 430 if the current monitored charge level of battery pack 265 meets or exceeds the persistent BMU shutdown threshold, and if so the persistent BMU shutdown flag is cleared from persistent memory in step 432. Similarly, it is determined in step 434 if the current monitored charge level of battery pack 265 meets or exceeds the persistent EC shutdown threshold, and if so the persistent EC shutdown flag is cleared from persistent memory in step 436. In step 438, it is determined if the current monitored charge level of battery pack 265 meets or exceeds the persistent OS shutdown threshold. If not, then methodology 400 returns to step 420 as shown. However, if it is determined in step 438 that the current monitored charge level of battery pack 265 meets or exceeds the persistent OS shutdown threshold, then methodology 400 proceed to step 448 where the persistent shutdown flag is cleared from persistent memory to allow EC 280 (e.g., using BIOS executing thereon) to again supply power to system load 320 (e.g., by closing D-FET 312) and to allow system boot and OS operation to be initiated on processor 205. Methodology 400 then terminates in step 450 as shown.

It will be understood that the disclosed systems and methods may be implemented in one exemplary embodiment with an information handling system having multiple battery packs and corresponding respective multiple BMUs. In such an embodiment, a persistent shutdown management circuitry may be implemented by one or more system processing devices to individually disconnect discharged battery packs from the system load until external power is applied to recharge the respective disconnected discharged battery packs in combination or singularly until the disconnected battery packs are charged above the corresponding minimum acceptable operating voltage threshold, at which time the disconnected battery packs may be reconnected to the system load.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network storage device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communications between the various hardware components.

It will also be understood that one or more of the tasks, functions, or methodologies described herein (e.g., for BMU 266, EC 280, processor 205 or other suitable processing device) may be implemented, for example, as firmware or other computer program of instructions embodied in a non-transitory tangible computer readable medium that is executed by a CPU, controller, microcontroller, processor, microprocessor, FPGA, ASIC, or other suitable processing device. Further, although replaceable smart battery packs are described in relation to some of the embodiments herein, it will be understood that the disclosed systems and methods may be implemented with battery systems that are non-replaceable and/or with battery systems controlled by external processing device/s.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed systems and methods may be utilized in various combinations and/or independently. Thus the invention is not limited to only those combinations shown herein, but rather may include other combinations.

What is claimed is:

1. An information handling system, comprising:
   one or more battery cells configured to be coupled to receive current from an external power source for recharging the battery cells;
   a system load comprising power consuming circuitry coupled to selectably receive current from the external power source, the battery cells, or a combination thereof, the system load including one or more processing devices;
   persistent memory; and
   persistent shutdown management circuitry including at least one of the processing devices coupled to the persistent memory;
   where at least one of the processing devices is configured to monitor the current charge level of the battery cells;
   where at least one of the processing devices is configured to execute an operating system thereon and to initiate shut down of the operating system and disconnection of at least a portion of the system load from the battery cells when the monitored battery charge level is below a predetermined minimum acceptable operating voltage threshold value; and
   where the persistent shutdown management circuitry is configured to:
      store a persistent shutdown indication in the persistent memory upon the occurrence of a shutdown of the operating system and the disconnection of at least a portion of the system load from the battery cells due to a monitored battery charge level that is below the predetermined minimum acceptable operating voltage threshold value,
      determine the presence of available power from the external power source and determine whether the persistent shutdown indication is stored in the persistent memory,
      if the persistent shutdown indication is determined to be stored in the persistent memory then allow one or more of the processing devices to reconnect the system load to the battery cells and to restart the operating system only if available power from the external power source is determined to be present for providing current to recharge the battery cells, and
      if the persistent shutdown indication is determined to be stored in the persistent memory then only clear the persistent shutdown indication from persistent memory if available power from the external power source is determined to be present for providing current to recharge the battery cells; and
   where the persistent shutdown management circuitry is further configured to store an additional persistent shut down indication for the persistent shutdown management circuitry in persistent memory and to shut down when the monitored battery charge level is below a predetermined safe shut off voltage threshold for the persistent shutdown management circuitry, the predetermined safe shut off voltage threshold for the persistent shutdown management circuitry being a lower voltage level than the predetermined minimum acceptable operating voltage threshold value; and where the persistent shutdown management circuitry is further configured to wake from the shutdown state upon sensing the presence of available power from an external power source.

2. The system of claim 1,
   the system load including multiple processing devices, and the persistent shutdown management circuitry including at least one of the processing devices coupled to the persistent memory;
   where at least one other of the processing devices is a central processing unit (CPU);
   where at least one of the processing devices of the persistent shutdown management circuitry is configured to monitor the current charge level of the battery cells and report the monitored battery charge level to the CPU;
   where the CPU is configured to execute the operating system (OS) thereon and to initiate shut down of the operating system and disconnection of at least a portion of the system load from the battery cells when the reported monitored battery charge level is below a predetermined minimum acceptable operating voltage threshold value for the operating system; and
   where the persistent shutdown management circuitry is configured to:
      store a persistent OS shutdown indication in the persistent memory upon the occurrence of a shutdown of the operating system and the disconnection of at least a portion of the system load from the battery cells due to a monitored battery charge level that is below the predetermined operating system minimum acceptable operating voltage threshold value,
      determine the presence of available power from the external power source and determine whether the persistent OS shutdown indication is stored in the persistent memory,
      if the persistent OS shutdown indication is determined to be stored in the persistent memory then allow one or more of the processing devices to reconnect the system load to the battery cells and to restart the operating system only if available power from the external power source is determined to be present for providing current to recharge the battery cells, and if the persistent OS shutdown indication is determined to be stored in the persistent memory then only clear the persistent OS shutdown indication from persistent memory if available power from the external power source is determined to be present for providing current to recharge the battery cells.

3. The system of claim 2, where the persistent shutdown management circuitry is configured to determine the presence of a persistent shutdown indication in the persistent memory upon waking up from a shutdown state; and if a persistent shutdown indication is determined to be stored in the persistent memory then allow one or more of the processing devices to reconnect the system load to the battery cells and to restart the operating system only if available power from the external power source is determined to be present for providing current to recharge the battery cells.

4. The system of claim 2, where the one or more processing devices comprise a first processing device and a second processing device; where the first processing device is configured to execute the operating system thereon; and where the persistent shutdown management circuitry comprises the second processing device.

5. The system of claim 2, where the one or more processing devices comprise a first processing device and a second processing device; where the first processing device is configured to execute the operating system thereon; where the persistent shutdown management circuitry comprises the second processing device; where the second processing device is configured to monitor the current charge level of the battery cells and to communicate the monitored current battery charge level to the first processing device; where the first processing device is configured to shut down the operating system when the monitored battery charge level is below a predetermined minimum acceptable operating voltage threshold value; and where the second processing device is configured to disconnect at least a portion of the system load including the first processing device from the battery cells and to store a persistent shutdown indication in the persistent memory when the monitored battery charge level is below the predetermined minimum acceptable operating voltage threshold value.

6. The system of claim 5, where the information handling system is a portable information handling system; where the information handling system further comprises a battery pack that includes the one or more battery cells and a battery management unit (BMU); where the first processing device comprises a central processing unit (CPU); and where the second processing device comprises the BMU.

7. The system of claim 2, where if the persistent OS shutdown indication is determined to be stored in the persistent memory then the persistent shutdown management circuitry is configured to:

allow one or more of the processing devices to reconnect the system load to the battery cells and to restart the operating system only if at least one of available power from the external power source is present and sufficient to power the system load and recharge the battery cells, available power from the external power source is present and the battery cells have a monitored battery charge level that is equal to or above the predetermined operating system minimum acceptable operating voltage threshold value, or a combination thereof; and clear the persistent OS shutdown indication from persistent memory only if at least one of available power from the external power source is present and sufficient to power the system load and recharge the battery cells, available power from the external power source is present and the battery cells have a monitored battery charge level that is equal to or above the predetermined operating system minimum acceptable operating voltage threshold value, or a combination thereof.

8. The system of claim 2, further comprising a battery management unit (BMU) configured as persistent shutdown management circuitry that includes the persistent memory.

9. An information handling system, comprising:

one or more battery cells configured to be coupled to receive current from an external power source for recharging the battery cells;

a system load comprising power consuming circuitry coupled to selectably receive current from the external power source, the battery cells, or a combination thereof, the system load including one or more processing devices;

persistent memory; and persistent shutdown management circuitry including at least one of the processing devices coupled to the persistent memory;

where at least one of the processing devices is configured to monitor the current charge level of the battery cells;

where at least one of the processing devices is configured to execute an operating system thereon and to initiate shut down of the operating system and disconnection of at least a portion of the system load from the battery cells when the monitored battery charge level is below a predetermined minimum acceptable operating voltage threshold value; and where the persistent shutdown management circuitry is configured to:

store a persistent shutdown indication in the persistent memory upon the occurrence of a shutdown of the operating system and the disconnection of at least a portion of the system load from the battery cells due to a monitored battery charge level that is below the predetermined minimum acceptable operating voltage threshold value, determine the presence of available power from the external power source and determine whether the persistent shutdown indication is stored in the persistent memory, if the persistent shutdown indication is determined to be stored in the persistent memory then allow one or more of the processing devices to reconnect the system load to the battery cells and to restart the operating system only if available power from the external power source is determined to be present for providing current to recharge the battery cells, and if the persistent shutdown indication is determined to be stored in the persistent memory then only clear the persistent shutdown indication from persistent memory if available power from the external power source is determined to be present for providing current to recharge the battery cells; and where the one or more processing devices comprise a first processing device, a second processing device, and a third processing device; where the first processing device is configured to execute the operating system thereon; where the persistent shutdown management circuitry comprises the second processing device and third processing device; where the third processing device is configured to monitor the current charge level of the battery cells and to communicate the monitored current battery charge level to the first and second processing devices; where the first processing device is configured to shut down the operating system when the monitored battery charge level is below a predetermined minimum acceptable operating voltage threshold value; where the second processing device is configured to disconnect at least a portion of the system load including the first processing device from the battery cells and to store a first persistent shutdown indication in the persistent memory when the monitored battery charge level is below the predetermined minimum acceptable operating voltage threshold value; where the third processing device is configured to disconnect the second processing device from the battery cells and to store a second persistent shutdown indication in the persistent memory when the monitored battery charge level is below a predetermined safe shut off voltage threshold for the second processing device; and where the third processing device is configured to shut itself down and to store a third persistent shutdown indication in the persistent memory when the monitored battery charge level is below a predetermined safe shut off voltage threshold for the third processing device, the predetermined safe shut off voltage threshold for the third processing device being a lower voltage level than the predetermined safe shut off voltage threshold for the second processing device, and the predetermined safe shut off voltage threshold for the second processing device being a lower voltage level than the predetermined minimum acceptable operating voltage threshold value.

10. The system of claim 9, where persistent shutdown management circuitry is configured to:
    clear each of the first, second and third persistent shutdown indications from persistent memory only if available power from the external power source is determined to be present for providing current to recharge the battery cells; and
    allow one or more of the processing devices to reconnect the system load to the battery cells and to restart the operating system only if available power from the external power source is determined to be present for providing current to recharge the battery cells.

11. The system of claim 9, where information handling system is a portable information handling system; where the information handling system further comprises a battery pack that includes the one or more battery cells and a battery management unit (BMU); where the first processing device comprises a central processing unit (CPU); where the second processing device comprises an embedded controller (EC); and where the third processing device comprises the BMU.

12. A method for implementing persistent battery shutdown for an information handling system, comprising:
    providing an information handling system that comprises:
        one or more battery cells configured to be coupled to receive current from an external power source for recharging the battery cells,
        a system load comprising power consuming circuitry coupled to selectably receive current from the external power source, the battery cells, or a combination thereof, the system load including one or more processing devices,
        persistent memory, and
        persistent shutdown management circuitry including at least one of the processing devices coupled to the persistent memory;
    using at least one of the processing devices to monitor the current charge level of the battery cells;
    using at least one of the processing devices to execute an operating system thereon and to initiate shut down of the operating system and disconnection of at least a portion of the system load from the battery cells when the monitored battery charge level is below a predetermined minimum acceptable operating voltage threshold value; and
    using the persistent shutdown management circuitry to:
        store a persistent shutdown indication in the persistent memory upon the occurrence of a shutdown of the operating system and the disconnection of at least a portion of the system load from the battery cells due to a monitored battery charge level that is below the predetermined minimum acceptable operating voltage threshold value,
        determine the presence of available power from the external power source and determine whether the persistent shutdown indication is stored in the persistent memory,
        if the persistent shutdown indication is determined to be stored in the persistent memory then allow one or more of the processing devices to reconnect the system load to the battery cells and to restart the operating system only if available power from the external power source is determined to be present for providing current to recharge the battery cells, and
        if the persistent shutdown indication is determined to be stored in the persistent memory then only clear the persistent shutdown indication from persistent memory if available power from the external power source is determined to be present for providing current to recharge the battery cells;
    storing an additional persistent shut down indication for the persistent shutdown management circuitry in persistent memory and to shutting down the persistent shutdown management circuitry when the monitored battery charge level is below a predetermined safe shut off voltage threshold for the persistent shutdown management circuitry, the predetermined safe shut off voltage threshold for the persistent shutdown management circuitry being a lower voltage level than the predetermined minimum acceptable operating voltage threshold value; and
    waking the persistent management shutdown circuitry from the shutdown state upon sensing the presence of available power from an external power source.

13. The method of claim 12, where the system load includes multiple processing devices, where the persistent shutdown management circuitry includes at least one of the processing devices coupled to the persistent memory, where at least one of the other processing devices is a central processing unit (CPU), and where the method further comprises:
    using at least one of the processing devices of the persistent shutdown management circuitry to monitor the current charge level of the battery cells and report the monitored battery charge level to the CPU;
    using the CPU to execute the operating system (OS) thereon and to initiate shut down of the operating system and disconnection of at least a portion of the system load from the battery cells when the reported monitored battery charge level is below a predetermined minimum acceptable operating voltage threshold value for the operating system; and
    using the persistent shutdown management circuitry to:
        store a persistent OS shutdown indication in the persistent memory upon the occurrence of a shutdown of the operating system and the disconnection of at least a portion of the system load from the battery cells due to a monitored battery charge level that is below the predetermined operating system minimum acceptable operating voltage threshold value,
determine the presence of available power from the external power source and determine whether the persistent OS shutdown indication is stored in the persistent memory,
if the persistent OS shutdown indication is determined to be stored in the persistent memory then allow one or more of the processing devices to reconnect the system load to the battery cells and to restart the operating system only if available power from the external power source is determined to be present for providing current to recharge the battery cells, and
if the persistent OS shutdown indication is determined to be stored in the persistent memory then only clear the persistent shutdown indication from persistent memory if available power from the external power source is determined to be present for providing current to recharge the battery cells.

14. The method of claim 13, further comprising using the persistent shutdown management circuitry to determine if the persistent shutdown indication is stored in the persistent memory; and if the persistent shutdown indication is determined to be stored in the persistent memory then using the persistent shutdown management circuitry to:
allow one or more of the processing devices to reconnect the system load to the battery cells and to restart the operating system only if at least one of available power from the external power source is present and sufficient to power the system load and recharge the battery cells, available power from the external power source is present and the battery cells have a monitored battery charge level that is equal to or above the predetermined minimum acceptable operating voltage threshold value, or a combination thereof; and
clear the persistent shutdown indication from persistent memory only if at least one of available power from the external power source is present and sufficient to power the system load and recharge the battery cells, available power from the external power source is present and the battery cells have a monitored battery charge level that is equal to or above the predetermined minimum acceptable operating voltage threshold value, or a combination thereof.

15. The method of claim 13, further comprising where the persistent shutdown management circuitry is configured to determine the presence of a persistent shutdown indication in the persistent memory upon waking up from a shutdown state; and if a persistent shutdown indication is determined to be stored in the persistent memory then allow one or more of the processing devices to reconnect the system load to the battery cells and to restart the operating system only if available power from the external power source is determined to be present for providing current to recharge the battery cells.

16. The method of claim 13, where the one or more processing devices comprise a first processing device and a second processing device; where the persistent shutdown management circuitry comprises the second processing device; and where the method further comprises using the first processing device to execute the operating system thereon.

17. The method of claim 13, where the information handling system further comprises a battery management unit (BMU) configured as persistent shutdown management circuitry that includes the persistent memory.

18. The method of claim 13, where the one or more processing devices comprise a first processing device and a second processing device; where the persistent shutdown management circuitry comprises the second processing device; and where the method further comprises:
executing the operating system on the first processing device;
monitoring the current charge level of the battery cells with the second processing device and communicating the monitored current battery charge level from the second processing device to the first processing device;
shutting down the operating system on the first processing device when the monitored battery charge level is below a predetermined minimum acceptable operating voltage threshold value; and
using the second processing device to disconnect at least a portion of the system load including the first processing device from the battery cells and to store a persistent shutdown indication in the persistent memory when the monitored battery charge level is below the predetermined minimum acceptable operating voltage threshold value.

19. The method of claim 18, where the information handling system is a portable information handling system; where the information handling system further comprises a battery pack that includes the one or more battery cells and a battery management unit (BMU); where the first processing device comprises a central processing unit (CPU); and where the second processing device comprises the BMU.

20. A method for implementing persistent battery shutdown for an information handling system, comprising:
providing an information handling system that comprises:
one or more battery cells configured to be coupled to receive current from an external power source for recharging the battery cells,
a system load comprising power consuming circuitry coupled to selectably receive current from the external power source, the battery cells, or a combination thereof, the system load including one or more processing devices,
persistent memory, and
persistent shutdown management circuitry including at least one of the processing devices coupled to the persistent memory;
using at least one of the processing devices to monitor the current charge level of the battery cells;
using at least one of the processing devices to execute an operating system thereon and to initiate shut down of the operating system and disconnection of at least a portion of the system load from the battery cells when the monitored battery charge level is below a predetermined minimum acceptable operating voltage threshold value; and
using the persistent shutdown management circuitry to:
store a persistent shutdown indication in the persistent memory upon the occurrence of a shutdown of the operating system and the disconnection of at least a portion of the system load from the battery cells due to a monitored battery charge level that is below the predetermined minimum acceptable operating voltage threshold value,
determine the presence of available power from the external power source and determine whether the persistent shutdown indication is stored in the persistent memory,
if the persistent shutdown indication is determined to be stored in the persistent memory then allow one or more of the processing devices to reconnect the system load to the battery cells and to restart the operating system only if available power from the external power source is determined to be present for providing current to recharge the battery cells, and if the persistent shutdown indication is determined to be stored in the persistent memory then only clear the persistent shutdown indication from persistent memory if available power from the external power source is determined to be present for providing current to recharge the battery cells;

where the one or more processing devices comprise a first processing device, a second processing device, and a third processing device; where the persistent shutdown management circuitry comprises the second processing device and third processing device; and where the method further comprises:
executing the operating system on the first processing device,
using the third processing device to monitor the current charge level of the battery cells and to communicate the monitored current battery charge level to the first and second processing devices,
using the first processing device to shut down the operating system when the monitored battery charge level is below a predetermined minimum acceptable operating voltage threshold value,
using the second processing device to disconnect at least a portion of the system load including the first processing device from the battery cells and to store a first persistent shutdown indication in the persistent memory when the monitored battery charge level is below the predetermined minimum acceptable operating voltage threshold value,
using the third processing device to disconnect the second processing device from the battery cells and to store a second persistent shutdown indication in the persistent memory when the monitored battery charge level is below a predetermined safe shut off voltage threshold for the second processing device, and
using the third processing device to shut itself down and to store a third persistent shutdown indication in the persistent memory when the monitored battery charge level is below a predetermined safe shut off voltage threshold for the third processing device, the predetermined safe shut off voltage threshold for the third processing device being a lower voltage level than the predetermined safe shut off voltage threshold for the second processing device, and the predetermined safe shut off voltage threshold for the second processing device being a lower voltage level than the predetermined minimum acceptable operating voltage threshold value.

21. The method of claim 20, further comprising using the persistent shutdown management circuitry is configured to:
clear each of the first, second and third persistent shutdown indications from persistent memory only if available power from the external power source is determined to be present for providing current to recharge the battery cells; and
allow one or more of the processing devices to reconnect the system load to the battery cells and to restart the operating system only if available power from the external power source is determined to be present for providing current to recharge the battery cells.

22. The method of claim 20, where information handling system is a portable information handling system; where the information handling system further comprises a battery pack that includes the one or more battery cells and a battery management unit (BMU); where the first processing device comprises a central processing unit (CPU); where the second processing device comprises an embedded controller (EC); and where the third processing device comprises the BMU.

23. An information handling system, comprising:
one or more battery cells configured to be coupled to receive current from an external power source for recharging the battery cells;
a system load comprising power consuming circuitry coupled to selectably receive current from the external power source, the battery cells, or a combination thereof, the system load including multiple processing devices;
persistent memory; and
persistent shutdown management circuitry including at least one of the processing devices coupled to the persistent memory;
where at least one other of the processing devices is a central processing unit (CPU);
where at least one of the processing devices of the persistent shutdown management circuitry is configured to monitor the current charge level of the battery cells and report the monitored battery charge level to the CPU;
where the CPU is configured to execute an operating system (OS) thereon and to initiate shut down of the operating system and disconnection of at least a portion of the system load from the battery cells when the reported monitored battery charge level is below a predetermined minimum acceptable operating voltage threshold value for the operating system; and
where the persistent shutdown management circuitry is configured to:
store a persistent OS shutdown indication in the persistent memory upon the occurrence of a shutdown of the operating system and the disconnection of at least a portion of the system load from the battery cells due to a monitored battery charge level that is below the predetermined operating system minimum acceptable operating voltage threshold value,
determine the presence of available power from the external power source and determine whether the persistent OS shutdown indication is stored in the persistent memory,
if the persistent OS shutdown indication is determined to be stored in the persistent memory then allow one or more of the processing devices to reconnect the system load to the battery cells and to restart the operating system only if available power from the external power source is determined to be present for providing current to recharge the battery cells, and
if the persistent OS shutdown indication is determined to be stored in the persistent memory then only clear the persistent OS shutdown indication from persistent memory if available power from the external power source is determined to be present for providing current to recharge the battery cells; and where the one or more processing devices further comprise a first processing device, a second processing device and a third processing device; where the first processing device is configured to execute the operating system thereon; where the persistent shutdown management circuitry comprises the second processing device and third processing device; where the third processing device is configured to monitor the current charge level of the battery cells and to communicate the monitored current battery charge level to the first CPU and second processing device; where the CPU first processing device is configured to shut down the operating system when the monitored battery charge level is below a the predetermined operating system minimum acceptable operating voltage threshold value; where the second processing device is configured to disconnect at least a portion of the system load including the first processing device from the battery cells and to store a first persistent shutdown indication in the persistent memory when the monitored battery charge level is below the predetermined operating system minimum acceptable operating voltage threshold value; where the third processing device is configured to disconnect the second processing device from the battery cells and to store a second persistent shutdown indication in the persistent memory when the monitored battery charge level is below a predetermined safe shut off voltage threshold for the second processing device; and where the third processing device is configured to shut itself down and to store a third persistent shutdown indication in the persistent memory when the monitored battery charge level is below a predetermined safe shut off voltage threshold for the third processing device, the predetermined safe shut off voltage threshold for the third processing device being a lower voltage level than the predetermined safe shut off voltage threshold for the second processing device, and the predetermined safe shut off voltage threshold for the second processing device being a lower voltage level than the predetermined minimum operating system acceptable operating voltage threshold value.

24. The system of claim 23, where persistent shutdown management circuitry is configured to:
   clear each of the persistent OS shutdown indication and the second and third persistent shutdown indications from persistent memory only if available power from the external power source is determined to be present for providing current to recharge the battery cells; and
   allow one or more of the processing devices to reconnect the system load to the battery cells and to restart the operating system only if available power from the external power source is determined to be present for providing current to recharge the battery cells.

25. The system of claim 23, where information handling system is a portable information handling system; where the information handling system further comprises a battery pack that includes the one or more battery cells and a battery management unit (BMU); where the first processing device comprises a central processing unit (CPU); where the second processing device comprises an embedded controller (EC); and where the third processing device comprises the BMU.

26. A method for implementing persistent battery shutdown for an information handling system, comprising:
   providing an information handling system that comprises:
      one or more battery cells configured to be coupled to receive current from an external power source for recharging the battery cells,
      a system load comprising power consuming circuitry coupled to selectably receive current from the external power source, the battery cells, or a combination thereof, the system load including multiple processing devices,
      persistent memory, and
      persistent shutdown management circuitry including at least one of the processing devices coupled to the persistent memory,
      where at least one of the other processing devices is a central processing unit (CPU);
   using at least one of the processing devices of the persistent shutdown management circuitry to monitor the current charge level of the battery cells and report the monitored battery charge level to the CPU;
   using the CPU to execute an operating system (OS) thereon and to initiate shut down of the operating system and disconnection of at least a portion of the system load from the battery cells when the reported monitored battery charge level is below a predetermined minimum acceptable operating voltage threshold value for the operating system; and
   using the persistent shutdown management circuitry to:
      store a persistent OS shutdown indication in the persistent memory upon the occurrence of a shutdown of the operating system and the disconnection of at least a portion of the system load from the battery cells due to a monitored battery charge level that is below the predetermined operating system minimum acceptable operating voltage threshold value,
      determine the presence of available power from the external power source and determine whether the persistent OS shutdown indication is stored in the persistent memory,
      if the persistent OS shutdown indication is determined to be stored in the persistent memory then allow one or more of the processing devices to reconnect the system load to the battery cells and to restart the operating system only if available power from the external power source is determined to be present for providing current to recharge the battery cells, and
      if the persistent OS shutdown indication is determined to be stored in the persistent memory then only clear the persistent shutdown indication from persistent memory if available power from the external power source is determined to be present for providing current to recharge the battery cells; and
   where the processing devices further comprise an embedded controller (EC) or a battery management unit (BMU); and where the method further comprises:
      storing an additional persistent EC or BMU shut down indication for the persistent shutdown management circuitry in persistent memory and to shutting down the persistent shutdown management circuitry when the monitored battery charge level is below a predetermined safe shut off voltage threshold for the respective embedded cont roller or battery management unit of the persistent shutdown management circuitry, the predetermined EC or BMU safe shut off voltage threshold for the persistent shutdown management circuitry being a lower voltage level than the predetermined operating system minimum acceptable operating voltage threshold value, and
   waking the persistent management shutdown circuitry from the shutdown state upon sensing the presence of available power from an external power source.

27. An information handling system, comprising:
   one or more battery cells configured to be coupled to receive current from an external power source for recharging the battery cells;
   a system load comprising power consuming circuitry coupled to selectably receive current from the external power source, the battery cells, or a combination thereof, the system load including multiple processing devices;
   persistent memory; and
   persistent shutdown management circuitry including at least one of the processing devices coupled to the persistent memory;
   where at least one other of the processing devices is a central processing unit (CPU);

where at least one of the processing devices of the persistent shutdown management circuitry is configured to monitor the current charge level of the battery cells and report the monitored battery charge level to the CPU;

where the CPU is configured to execute an operating system (OS) thereon and to initiate shut down of the operating system and disconnection of at least a portion of the system load from the battery cells when the reported monitored battery charge level is below a predetermined minimum acceptable operating voltage threshold value for the operating system; and where the persistent shutdown management circuitry is configured to:
store a persistent OS shutdown indication in the persistent memory upon the occurrence of a shutdown of the operating system and the disconnection of at least a portion of the system load from the battery cells due to a monitored battery charge level that is below the predetermined operating system minimum acceptable operating voltage threshold value,
determine the presence of available power from the external power source and determine whether the persistent OS shutdown indication is stored in the persistent memory,
if the persistent OS shutdown indication is determined to be stored in the persistent memory then allow one or more of the processing devices to reconnect the system load to the battery cells and to restart the operating system only if available power from the external power source is determined to be present for providing current to recharge the battery cells, and
if the persistent OS shutdown indication is determined to be stored in the persistent memory then only clear the persistent OS shutdown indication from persistent memory if available power from the external power source is determined to be present for providing current to recharge the battery cells; and where the processing devices further comprise an embedded controller (EC) or a battery management unit (BMU); where the persistent shutdown management circuitry is further configured to store an additional EC or BMU persistent shut down indication for the persistent shutdown management circuitry in persistent memory and to shut down when the monitored battery charge level is below a predetermined safe shut off voltage threshold for the respective embedded controller or battery management unit of the persistent shutdown management circuitry, the predetermined EC or BMU safe shut off voltage threshold for the persistent shutdown management circuitry being a lower voltage level than the predetermined operating system minimum acceptable operating voltage threshold value; and where the respective embedded controller or battery management unit of the persistent shutdown management circuitry is further configured to wake from the shutdown state upon sensing the presence of available power from an external power source.

28. A method for implementing persistent battery shutdown for an information handling system, comprising:
providing an information handling system that comprises:
one or more battery cells configured to be coupled to receive current from an external power source for recharging the battery cells,
a system load comprising power consuming circuitry coupled to selectably receive current from the external power source, the battery cells, or a combination thereof, the system load including multiple processing devices,
persistent memory, and
persistent shutdown management circuitry including at least one of the processing devices coupled to the persistent memory,
where at least one of the other processing devices is a central processing unit (CPU);

using at least one of the processing devices of the persistent shutdown management circuitry to monitor the current charge level of the battery cells and report the monitored battery charge level to the CPU;

using the CPU to execute an operating system (OS) thereon and to initiate shut down of the operating system and disconnection of at least a portion of the system load from the battery cells when the reported monitored battery charge level is below a predetermined minimum acceptable operating voltage threshold value for the operating system; and using the persistent shutdown management circuitry to:
store a persistent OS shutdown indication in the persistent memory upon the occurrence of a shutdown of the operating system and the disconnection of at least a portion of the system load from the battery cells due to a monitored battery charge level that is below the predetermined operating system minimum acceptable operating voltage threshold value,
determine the presence of available power from the external power source and determine whether the persistent OS shutdown indication is stored in the persistent memory,
if the persistent OS shutdown indication is determined to be stored in the persistent memory then allow one or more of the processing devices to reconnect the system load to the battery cells and to restart the operating system only if available power from the external power source is determined to be present for providing current to recharge the battery cells, and
if the persistent OS shutdown indication is determined to be stored in the persistent memory then only clear the persistent shutdown indication from persistent memory if available power from the external power source is determined to be present for providing current to recharge the battery cells; and where the one or more processing devices comprise a first processing device, a second processing device and a third processing device; where the persistent shutdown management circuitry comprises the second processing device and third processing device; and where the method further comprises:
executing the operating system on the first processing device,
using the third processing device to monitor the current charge level of the battery cells and to communicate the monitored current battery charge level to the CPU first and second processing device,
using the CPU to shut down the operating system when the monitored battery charge level is below the predetermined operating system minimum acceptable operating voltage threshold value,
using the second processing device to disconnect at least a portion of the system load including the first processing device from the battery cells and to store a first persistent shutdown indication in the persistent memory when the monitored battery charge level is below the predetermined operating system minimum acceptable operating voltage threshold value, and using the third processing device to: disconnect the second processing device from the battery cells and to store a second persistent shutdown indication in the persistent memory when the monitored battery charge level is below a predetermined safe shut off voltage threshold for the second processing device, and shut itself down and to store a third persistent shutdown indication in the persistent memory when the monitored battery charge level is below a predetermined safe shut off voltage threshold for the third processing device, the predetermined safe shut off voltage threshold for the third processing device being a lower voltage level than the predetermined safe shut off voltage threshold for the second processing device, and the predetermined safe shut off voltage threshold for the second processing device being a lower voltage level than the predetermined operating system minimum acceptable operating voltage threshold value.

29. The method of claim 28, further comprising using the persistent shutdown management circuitry is configured to:

clear each of the persistent OS shutdown indication, and the second and third persistent shutdown indications from persistent memory only if available power from the external power source is determined to be present for providing current to recharge the battery cells; and allow one or more of the processing devices to reconnect the system load to the battery cells and to restart the operating system only if available power from the external power source is determined to be present for providing current to recharge the battery cells.

30. The method of claim 28, where information handling system is a portable information handling system; where the information handling system further comprises a battery pack that includes the one or more battery cells and a battery management unit (BMU); where the first processing device comprises a central processing unit (CPU); where the second processing device comprises an embedded controller (EC); and where the third processing device comprises the BMU.

* * * * *